United States Patent
Ramabaja

(10) Patent No.: US 12,013,830 B2
(45) Date of Patent: Jun. 18, 2024

(54) SYSTEM AND METHOD USING BLOOM FILTERS TO IMPROVE SYSTEM RELIABILITY

(71) Applicant: FETCH.AI LIMITED, Suffolk (GB)

(72) Inventor: Lum Ramabaja, Linz (AT)

(*) Notice: Subject to any disclaimer, the term of this patent is extended or adjusted under 35 U.S.C. 154(b) by 172 days.

(21) Appl. No.: 17/769,176

(22) PCT Filed: Oct. 16, 2020

(86) PCT No.: PCT/IB2020/059755
§ 371 (c)(1),
(2) Date: Apr. 14, 2022

(87) PCT Pub. No.: WO2021/074875
PCT Pub. Date: Apr. 22, 2021

(65) Prior Publication Data
US 2023/0350865 A1   Nov. 2, 2023

(30) Foreign Application Priority Data

Oct. 16, 2019 (EP) .................................. 19020580

(51) Int. Cl.
*G06F 16/22* (2019.01)
*G06F 16/2458* (2019.01)

(52) U.S. Cl.
CPC ...... *G06F 16/2255* (2019.01); *G06F 16/2462* (2019.01)

(58) Field of Classification Search
CPC .................. G06F 16/2255; G06F 16/2462
(Continued)

(56) References Cited

U.S. PATENT DOCUMENTS

2004/0086117 A1* 5/2004 Petersen ............... H04L 9/0668
380/44
2010/0274893 A1* 10/2010 Abdelal ................ H04L 47/263
709/224
(Continued)

OTHER PUBLICATIONS

Extended European Search Report issued in EP Application No. EP19020580.7 on Mar. 5, 2020, 9 pages.
(Continued)

*Primary Examiner* — Muluemebet Gurmu
(74) *Attorney, Agent, or Firm* — RC Trademark Company

(57) ABSTRACT

There is disclosed a system (100) comprising computing nodes (102A, 102B, 102C, 102D), wherein each computing node includes processor (104A, 104B, 104C, 104D), wherein each computing node comprises hash value of each data entity of pre-existing data entities therein, and wherein system (100) operates to provide verified recordal of data entities therein to ensure consistent recordal of data that assists to ensure reliable, efficient and robust operation of the system (100). The processor (104A, 104B, 104C, 104D) is configured to perform process comprising: executing first set of instructions on first computing node (102A) and second computing node (102B) to generate first set of values; executing second set of instructions on the hash value of each pre-existing data entity of first computing node (102A) and first set of values, to generate second set of values; generating data structure based on the second set of values; transmitting data structure; determining a mapping factor based on pre-existing data entities in second computing node (102B); and transmitting data entities from first computing node (102A) to second computing node (102B) if the mapping factor is less than 100 percent.

11 Claims, 3 Drawing Sheets

(58) Field of Classification Search
USPC .......................................................... 707/747
See application file for complete search history.

(56) References Cited

U.S. PATENT DOCUMENTS

| 2012/0011150 A1* | 1/2012 | Swaminathan ....... G06F 16/334 |
| | | 707/E17.032 |
| 2017/0075984 A1* | 3/2017 | Deshpande ......... G06F 16/9535 |
| 2019/0138401 A1 | 5/2019 | Davis |
| 2019/0289091 A1 | 9/2019 | Burns et al. |
| 2020/0278471 A1* | 9/2020 | Dixon ................. G06F 16/9024 |

OTHER PUBLICATIONS

International Search Report and Written Opinion of the International Searching Authority issued in International Patent Application No. PCT/IB2020/059755 on Feb. 25, 2021, 11 pages.

* cited by examiner

SYSTEM AND METHOD USING BLOOM FILTERS TO IMPROVE SYSTEM RELIABILITY

TECHNICAL FIELD

The present disclosure relates generally to systems that communicate data therein, and more specifically to systems that employ Bloom filter-type arrangements for improving system operating stability, efficiency and robustness. Moreover, the present disclosure relates to methods of improving system operating stability, efficiency and robustness by providing consistent recordal of data entities between plurality of computing nodes

BACKGROUND

In contemporary known systems, several computing devices communicating with each other in a distributed environment that often requires synchronizing of states between the computing devices. Without such synchronizing of states, systems become vulnerable to third party attack and also potential data loss within the systems. In many distributed computing systems this type of problem is known as "set reconciliation", and it is commonly accepted as being a fundamental technical problem in distributed computing systems.

The aforesaid states include, but are not limited to, operation affecting database records, transactions and files. For synchronizing the states between a given computing device and other computing devices in the distributed environment, each of the other computing devices is searched with respect to the states already existing in the given computing device. However, this method of searching the states in each computing device is data memory intensive and time inefficient, resulting in a reduced system responsiveness.

Recently, a type of data structure known as "Bloom filters" are being employed to verify which states in the given computing device are absent compared to states in other computing devices. The Bloom filters used conventionally enable synchronization of states between computing device in a rapid and data memory-efficient manner. For example, a Bloom filter is used to determine an availability of a unique username for a website in a distributed environment, where each computing device comprises already registered usernames. However, a probabilistic nature of the conventionally utilized Bloom filter leads to false positive responses in which a given computing device potentially falsely predicts that a given state is present in it, in comparison to states in other computing devices. Consequently, inconsistencies occur across the distributed system, resulting in potentially system operating instabilities and vulnerability to third-party hostile attacks. With an increase in the number of computing devices in the distributed system, such as with contemporary networks, the false positive responses and inconsistencies potentially increase as a function of elapsed time. To overcome the problem of false positive responses and reduce inconsistencies in the computing device, a Bloom filter having a significantly large size is required. However, increasing the size of the Bloom filter makes the Bloom filter data memory utilization inefficient and also increases a time period required to synchronize states between the computing devices, which is not desirable because system response is adversely affected.

Therefore, in light of the foregoing discussion, there exists a need to overcome the aforementioned drawbacks associated with conventional Bloom filters when used to synchronizing states in distributed systems, to improve system stability and reliability of operation.

SUMMARY

The present disclosure seeks to provide a system that operates in a more stable and robust manner, by ensuring more consistent recordal of data entities within the system that affect operation of the system. The present disclosure also seeks to provide a method of operating a system in a more stable and robust manner, by ensuring more consistent recordal of data entities within the system that affect operation of the system. The present disclosure seeks to provide a solution to the existing problem of unreliable and inefficient system operation arising due to inconsistencies in the data entities present in computing devices in distributed environment. An aim of the present disclosure is to provide a solution that overcomes at least partially the problems encountered in prior art, and provides improved system operation by ensuring a consistent recording of data entities in the computing devices.

In an aspect, the present disclosure provides a system comprising a plurality of computing nodes that are communicably coupled to each other via a distributed communication network, wherein each computing node includes a processor, wherein each computing node comprises a hash value of each data entity of pre-existing data entities therein, and wherein the system operates to provide verified recordal of data entities therein to achieve a more stable, efficient and robust operation of the system,
wherein:
  the processor is configured to perform a process comprising:
    executing a first set of instructions on a nonce of a first computing node of the plurality of computing nodes and a nonce of a second computing node of the plurality of computing nodes to generate a first set of values;
    executing a second set of instructions on the hash value of each pre-existing data entity of the first computing node and the first set of values, to generate a second set of values;
    generating a data structure for the first computing node and the second computing node based on the second set of values;
    transmitting the data structure from the first computing node to the second computing node;
    determining a mapping factor based on the data structure representative of whether or not the pre-existing data entities in the second computing node are consistent with respect to the pre-existing data entities in the first computing node; and
    transmitting one or more data entities from the pre-existing data entities in the first computing node to the pre-existing data entities in the second computing node if the determined mapping factor is less than 100 percent.

The invention is of advantage in that by specially configuring a manner in which nodes function within the system when they exchange data, there is provided a reliable mapping recordal of data entities within the system that makes operation of the system more stable, efficient and robust. Improvements in efficiency, robustness and stability may also be referred to, or measure as, an improvement in system availability (less downtime), system responsiveness (higher processing speed), or channel capacity (higher available bandwidth), which in this case means the amount (or quantity) of data that can be transmitted between the nodes in the distributed communication network.

In another aspect, the present disclosure provides a method of operating a system comprising a plurality of computing nodes that are communicably coupled to each other via a distributed communication network, wherein each computing node includes a processor, and wherein each computing node comprises a hash value of each data entity of pre-existing data entities therein, and wherein the system operates to provide verified recordal of data entities therein, to achieve a more stable, efficient and robust operation of the system,
wherein:
  the method includes configuring the processor to perform a process comprising:
    executing a first set of instructions on a nonce of a first computing node of the plurality of computing nodes and a nonce of a second computing node of the plurality of computing nodes to generate a first set of values;
    executing a second set of instructions on the hash value of each pre-existing data entity of the first computing node and the first set of values, to generate a second set of values;
    generating a data structure for the first computing node and the second computing node based on the second set of values;
    transmitting the data structure from the first computing node to the second computing node;
    determining a mapping factor based on the data structure representative of whether or not the pre-existing data entities in the second computing node are consistent with respect to the pre-existing data entities in the first computing node; and
    transmitting one or more data entities from the pre-existing data entities in the first computing node to the pre-existing data entities in the second computing node if the determined mapping factor is less than 100 percent.

In yet another aspect, an embodiment of the present disclosure provides a computer program product comprising a non-transitory computer-readable storage medium having computer-readable instructions stored thereon, the computer-readable instructions being executable by a computerized device comprising processing hardware to execute the aforesaid method.

Embodiments of the present disclosure substantially eliminate or at least partially address the aforementioned problems in the prior art, and enables time and space efficient recording of data entities in the computing nodes of the distributed network.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
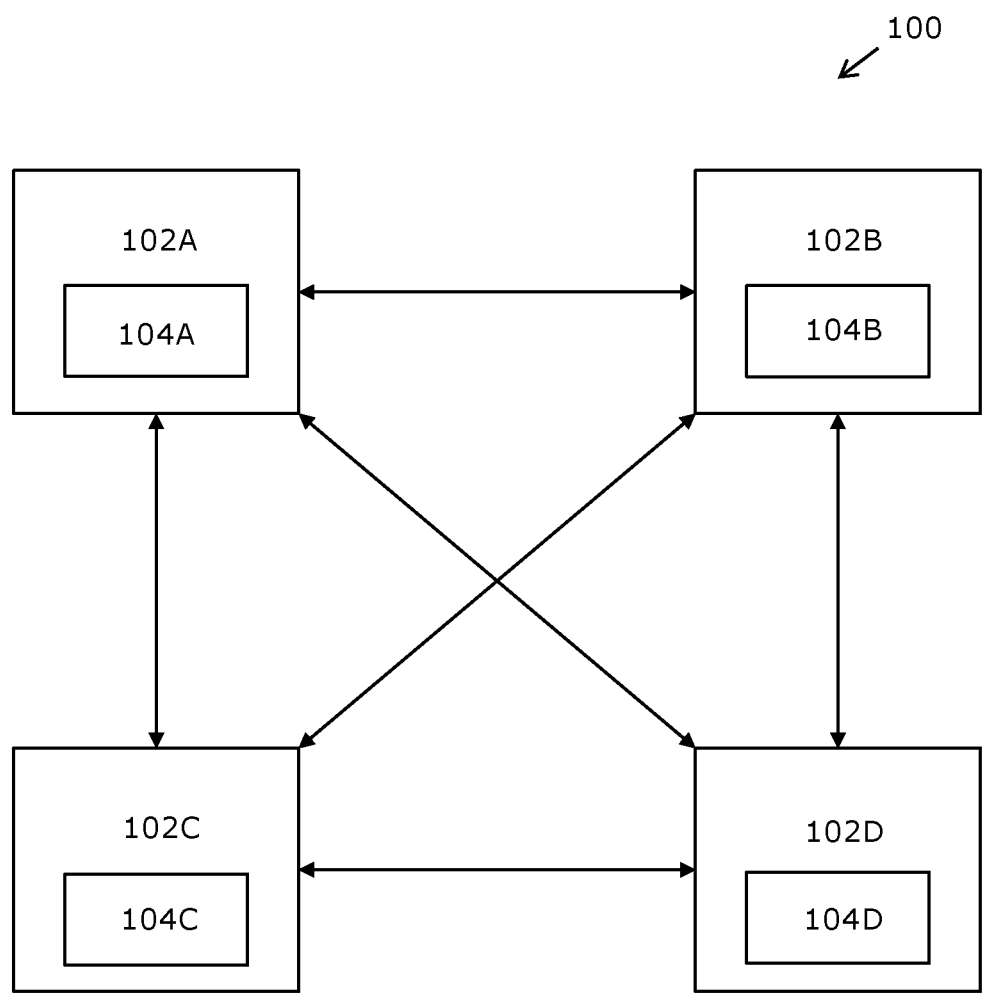
FIG. 1 is a schematic illustration of a system that, when in operation, provides verified recordal of data entities therein, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a system comprising a plurality of computing nodes that are communicably coupled to each other via a distributed communication network, wherein each computing node includes a processor, wherein each computing node comprises a hash value of each data entity of pre-existing data entities therein, and wherein the system operates to provide verified recordal of data entities therein, to achieve a more stable, efficient and robust operation of the system,
wherein:
  the processor is configured to perform a process comprising:
    executing a first set of instructions on a nonce of a first computing node of the plurality of computing nodes and a nonce of a second computing node of the plurality of computing nodes to generate a first set of values;
    executing a second set of instructions on the hash value of each pre-existing data entity of the first computing node and the first set of values, to generate a second set of values;
    generating a data structure for the first computing node and the second computing node based on the second set of values;
    transmitting the data structure from the first computing node to the second computing node;

determining a mapping factor based on the data structure representative of whether or not the pre-existing data entities in the second computing node are consistent with respect to the pre-existing data entities in the first computing node; and transmitting one or more data entities from the pre-existing data entities in the first computing node to the pre-existing data entities in the second computing node if the determined mapping factor is less than 100 percent.

In another aspect, an embodiment of the present disclosure provides a method of operating a system comprising a plurality of computing nodes that are communicably coupled to each other via a distributed communication network, wherein each computing node includes a processor, and wherein each computing node comprises a hash value of each data entity of pre-existing data entities therein, and wherein the system operates to provide verified recordal of data entities therein, to achieve a more stable, efficient and robust operation of the system,
wherein:

the method includes configuring the processor to perform a process comprising:

executing a first set of instructions on a nonce of a first computing node of the plurality of computing nodes and a nonce of a second computing node of the plurality of computing nodes to generate a first set of values;

executing a second set of instructions on the hash value of each pre-existing data entity of the first computing node and the first set of values, to generate a second set of values;

generating a data structure for the first computing node and the second computing node based on the second set of values;

transmitting the data structure from the first computing node to the second computing node;

determining a mapping factor based on the data structure representative of whether or not the pre-existing data entities in the second computing node are consistent with respect to the pre-existing data entities in the first computing node; and transmitting one or more data entities from the pre-existing data entities in the first computing node to the pre-existing data entities in the second computing node if the determined mapping factor is less than 100 percent.

In yet another aspect, an embodiment of the present disclosure provides a computer program product comprising a non-transitory computer-readable storage medium having computer-readable instructions stored thereon, the computer-readable instructions being executable by a computerized device comprising processing hardware to execute the aforesaid method.

The present disclosure provides the system that is operable to provide verified recordal of the data entities in the plurality of computing nodes in the distributed communication network, such as a blockchain; the verified recordal ensures consistency of recordal of the data entities in the plurality of computing nodes in the distributed communication network. In a blockchain network, each of the plurality of computing nodes comprises a record of earlier transactions. Moreover, upon an addition of a new transaction in the blockchain network, the new transaction is added to the record of earlier transactions at each of the plurality of computing nodes to provide verified recordal of the data entities. Since the distributed communication network is a decentralized network and thereby requires consensus of each of the computing nodes for enabling addition of a new data entity, this requires verified recordal of the data entities in the plurality of computing nodes. The verified recordal of the data entities enables there to be maintained a similar record of data entities at each of the plurality of computing nodes; such consistency ensures that computing nodes can rely on each other that improves a reliability and robust of operation of the system. Furthermore, the verified recordal of the data entities, namely consistent recordal of the data entities, enables the system to be made secure, fraud proof, and transparent in its operation.

The present disclosure provides an improved system and method for verified recordal of the data entities between the plurality of computing nodes using the data structure such as a Bloom filter. Conventionally, a same Bloom filter is sent to the plurality of computing nodes; however, the present system generates and transmits a unique Bloom filter for each pair of computing nodes. The disclosed system determines similarity and dissimilarity in the data entities between a pair of computing nodes in the plurality of computing nodes without sending a whole set of data entities. Thereby, the present system requires fewer computations and is more time-efficient when determining which data entities are missing in a given computing node, compared to a system utilizing a conventional Bloom filter. Furthermore, as the data entities are not stored in the Bloom filter, the system is highly data memory-efficient in utilization. Moreover, a probability of a given computing node determining a false positive is reduced. As a result, there is verified recordal of data entities in the computing nodes, wherein the verified recordal provides enhanced consistency of data.

The system comprises the plurality of computing nodes that are communicably coupled to each other via the distributed communication network. Throughout the present disclosure, the term "computing node" as used herein refers to an electronic device associated with (or used by) a user that is capable of enabling the user to perform specific tasks associated with the aforementioned system. Furthermore, the computing device is intended to be broadly interpreted to include any electronic device that is used for data communication over a network. Examples of the computing nodes include, but are not limited to, cellular phones, personal digital assistants (PDAs), handheld devices, wireless modems, laptop computers, personal computers and the like. Optionally, the computing node includes an apparatus casing, a data memory, a data network interface card, a microphone, a speaker, a keypad, and a display. It will be appreciated that the plurality of computing nodes is communicably coupled to each other to enable transfer of the data entities therebetween. Throughout the present disclosure, the term "distributed communication network" as used herein refers to an arrangement of interconnected programmable and/or non-programmable components of the plurality of computing nodes that are configured to facilitate data communication between one or more computing nodes. Specifically, the distributed communication network enables transfer of the data entities between each of the plurality of computing nodes. Moreover, the network is decentralised and there is no central computing node having a control of data transfer and/or exchange between the computing nodes in the network. In the present disclosure, the distributed communication network is optionally referred to as a blockchain network. In an example, the distributed communication network includes, but is not limited to, one or more peer-to-peer networks, a hybrid peer-to-peer network, one or more local area networks (LANs), one or more radio access networks (RANs), one or more metropolitan area networks (MANS), one or more wide area networks (WANs), all or a portion of a public network such as the global computer network known as the Internet®, a private network, a cellular network and any other communication system or systems at one or more spatial locations. Additionally, the plurality of computing nodes is connected via wireless connections or wired connections or a combination of wired and wireless connections.

Moreover, each computing node includes the processor. Throughout the present disclosure, the term "processor" relates to a computational element that is operable to respond to and processes instructions that drive the system. Examples of the processor includes but is not limited to a microprocessor, a microcontroller, a complex instruction set computing (CISC) microprocessor, a reduced instruction set (RISC) microprocessor, a very long instruction word (VLIW) microprocessor, a cluster of variable state machines, or any other type of processing circuit. Moreover, the term "processor" optionally refers to one or more individual processors, processing devices and various elements associated with a processing device that are optionally shared by other processing devices.

Each computing node comprises the hash value of each data entity of pre-existing data entities therein. The term "data entity" refers to a record of an operation between two computing nodes of the plurality of computing nodes. In an example, a data entity is a transaction record between two computing nodes. In another example, a transaction record concerns a situation where 5 units are transferred from a first computing node to the second computing node that is represented in a form of a data entity. The term "hash value" refers to a string representing the data entity. The hash value for each data entity is of a same size. In other words, the number of strings in the hash value of each data entity is same. Generally, each data entity is represented by a unique hash value. The term "pre-existing data entity" refers to a given record of an operation between two computing nodes which has a hash value already present in a given computing node. Each computing node comprises one or more pre-existing data entities.

In an embodiment, the processor is further configured to execute a hashing function to generate the hash value of each pre-existing data entity in the plurality of computing nodes. The term "hashing function" refers to an algorithm which takes a given data entity as an input and maps the given data entity to a given hash value having a unique string of a length similar for all the data entities; the hashing function can be considered as being a form of encryption. Examples of hashing function includes but are not limited to MD5, SHA-2, CRC-32 and the like. In an example, the MD-5 hashing function receives a given pre-existing data entity and maps it into 128-bit fingerprint. In another example, the SHA-2 hashing function receives a given pre-existing data entity and maps it into one of a 224, 256, 384 or 512-bit string. It will thus be appreciated that the processor uses encryption as a part of its manner of operation for achieving data protection.

The processor is configured to execute the first set of instructions on a nonce of the first computing node of the plurality of computing nodes and a nonce of the second computing node of the plurality of computing nodes to generate the first set of values. The term "nonce" as used herein refers to a unique value of a given computing node. Optionally, the nonce of a given computing node is generated by a counter. Optionally, the nonce of a given computing node is a unique identifier associated with the computing node. Throughout the present disclosure, the term "identifier" refers to a unique numeric or alphanumeric string associated with each computing node of the plurality of computing nodes which represents features and characteristics of a given computing node. The features and characteristics of a given computing node optionally include, but are not limited to, information related to a user using the computing node, hardware and software specifications of the given computing node. Optionally, the unique identifier of each computing node of the plurality of computing nodes is generated by the processor of the given computing node. More optionally, the processor of the given computing node employs an algorithm to generate the identifier. Moreover, the algorithm optionally uses the features and characteristics of the given computing node to generate identifier for the given computing node. It will be appreciated that the identifier is a combination of 0's and 1's. In an example, the unique identifier of the plurality of computing nodes is 001100, 010101, 101010, 111000 and the like. The term "process" refers to any collection or set of commands executable by a computer or other digital system so as to configure the computer or the digital system to perform a task that is the intent of the process. Specifically, the term "process" refers to the set of commands intended to provide verified recordal (namely, consistent recordal) of data entities in the plurality of computing nodes. Additionally, the process is intended to encompass such commands stored in storage medium such as RAM, a hard disk, optical disk, or so forth, and is also intended to encompass software stored on a ROM or so forth. Optionally, the process refers to a software application executed by the processor.

The term "first set of instructions" refers to a set of commands executed on nonce of two given computing nodes to generate first set of value for the two given computing nodes. Optionally, the first set of instructions is one or more mathematical functions employed between two given computing nodes. It is to be understood that the first set of instructions are executed between the nonce of each pair of the plurality of computing nodes. It will be appreciated that the one or more mathematic functions are employed to provide a verification of data of computing nodes, namely increasing trust within the system, that results in more reliable and robust operation of the system.

In an embodiment, the first set of instructions comprises executing an XOR mathematical function and the subsequent hashing function. The term "XOR mathematical function" is a binary logical function that gives a true output when only one of the inputs is true. The XOR mathematical function is applied between the nonce of the first computing node and the nonce of the second computing node. In an example, A and B are two nonce values of a first computing node and a second computing node respectively. In such an example, upon the execution of XOR mathematical function on the nonce values A and B, the output is:

((OR Boolean operator between (AND Boolean operator between A and compliment of B), (AND Boolean operator between compliment of A and B)).

For example, upon the execution of XOR mathematical function on the nonce values A and B where A is 0100110 and B is 1100111, the output is: 1000001. Furthermore, upon execution of XOR mathematical function, the hashing function is implemented on the output. Moreover, the hashing function is implemented on the output multiple times. The first set of values comprises each value of the output when it is hashed multiple times. In an example, the first set of values comprises the value of output when it is hashed a first time, a second time, a third time, a fourth time and a fifth time.

In an embodiment, the first set of instructions further comprises concatenating a random value before executing the hashing function. A given random value is concatenated to the output obtained upon executing XOR mathematical operation. The concatenation of the random value enables the process to provide verified recordal, namely consistent recordal, of the data entities even when the number of computing nodes are less. In an example, a random value 0110 is concatenated to the output 1000001 of execution of the XOR mathematical function on identifiers of a first computing node and a second computing node. In such an example, the result obtained is 1000111. The hashing function is implemented on the result 1000111.

The processor is configured to execute the second set of instructions on the hash value of each pre-existing data entity of the first computing node and the first set of values, to generate the second set of values. The term "second set of instructions" refers to a set of commands executed on the hash value of each pre-existing data entity of a first given computing node and the first set of values generated for a pair of given computing nodes having the first given computing node, to generate second set of values for the two given computing nodes. Optionally, the first computing node is the computing node acting as the reference with respect to which data consistency of other computing node is determined. More optionally, the first computing node is any one of the pair of computing nodes. The second set of instructions are implemented for every pair of computing nodes such as that the hash value of each pre-existing data entity of one of the computing node of the pair of computing nodes and the first set of values of the pair of computing nodes are employed to generate the second set of values. The set of instructions are implemented on each hash value and each value of the first set of values. In an example, the first set of instructions execute the hashing function 'k' times and the number of hash values in the first computing node is 'n'. In such an example, the second set of values comprises 'n multiplied k' number of values.

In an embodiment, the second set of instructions comprises executing an XOR mathematical function. The XOR mathematical function is executed between the hash value of each pre-existing data entity of the first computing node and the first set of values, to generate the second set of values.

The processor is configured to generate the data structure for the first computing node and the second computing node based on the second set of values. Throughout the present disclosure, the term "data structure" refers to a computing element employed for representation of data in way that enables easy accessibility of the data. Specifically, the data structure enables representation of the data entities for easy accessibility of the data. Moreover, the data structure provides information about the data entities present as hash values in the first computing node and the second computing node. The data structure is populated using the second set of values. In an example, the data structure is an array wherein each elements of the array represents a value of the second set of values.

In an embodiment, the data structure is a bloom filter. Throughout the present disclosure, the term "Bloom filter" refers to a computing element that represents, based on the process, similarity and dissimilarity between the data entities present as hashes in a pair of computing nodes. Specifically, the Bloom filter represents similarity and dissimilarity between the data entities present as hashes in the first computing node and the second computing node. The bloom filter is a data-memory-space efficient data structure as it does not store the data entities. Moreover, the Bloom filter uses minimal data-memory-space enabling a quick determination to be made if a given data entity is present in a computing node; in other words, the Bloom filter provides an efficient mechanism of verification to enable a quick determination to be made if a given data entity is present in a computing node. Additionally, the Bloom filter determines if a given data entity is not present in a computing node with a high accuracy; such a high accuracy improves dependability and reliability of operation of the one or more computing nodes of the system.

In an embodiment, the processor is further configured to execute a modulo mathematical operation on the second set of values before generating the data structure. The term "modulo mathematical operation" refers to executing a mathematical division on each of the second set of values by a number such as 'p' such that a remainder of the mathematical division of each of the second set of values is employed for generation of the data structure. Optionally, the value of the number 'p' employed by the modulo mathematical operation is dependent on size of the bloom filter.

The processor is further configured to transmit the data structure from the first computing node to the second computing node. The processor transmits the data structure from the first computing node to the second computing node via the distributed communication network. The data structure is transmitted to the second computing node to enable the second computing node to determine, based on the data structure, the pre-existing data entities that are consistent in the second computing node with respect to the pre-existing data entities in the first computing node. It is to be understood that the processor transmits the data structure from one computing to another computing node, for each pair of computing nodes for which the data structure is generated. Optionally, the second computing node stores the data structure in a database of the second computing node.

The processor is further configured to determine the mapping factor based on the data structure representative of whether or not the pre-existing data entities in the second computing node are consistent with respect to the pre-existing data entities in the first computing node; the mapping function provides a measure of consistency of data sets in the system. In the present disclosure, the term "mapping factor" refers to a percentage representing the pre-existing data entities in the second computing node which are consistent with the pre-existing data entities in the first computing node based on the data structure for the first computing node and the second computing node. The processor determines the mapping factor by mapping the pre-existing data entities in the second computing node with the pre-existing data entities in the first computing node based on the data structure. Optionally, a processor of the second computing node is employed for determining the mapping factor. In an example, if the mapping factor is equal to 100 percent, all the pre-existing data entities in the second computing node are considered to be consistent with the pre-existing data entities in the first computing node. In another example, if the mapping factor is less than 100 percent, one or more of the pre-existing data entities in the second computing node are considered to be inconsistent with the pre-existing data entities in the first computing node.

It will be appreciated that the processor, in an example, determines that the mapping factor is different from an actual mapping factor due to one or more false positives. The term "false positives" refers to a condition wherein one or more pre-existing data entities in the second computing node are inconsistent with the pre-existing data entities in the first computing node but the processor determines the aforesaid one or more pre-existing data entities in the second computing node to be consistent with the pre-existing data entities in the first computing node. Optionally, the processor determines the mapping factor to be equal to 100 percent even when one or more of the pre-existing data entities in the second computing node are inconsistent with the pre-existing data entities in the first computing node.

The processor is further configured to transmit one or more data entities from the pre-existing data entities in the first computing node to the pre-existing data entities in the second computing node if the determined mapping factor is less than 100 percent. As mentioned previously, if one or more of the pre-existing data entities in the second computing node are inconsistent with the pre-existing data entities in the first computing node, the mapping factor is considered to be less than 100 percent. The one or more data entities of the pre-existing data entities in the second computing node which is inconsistent with the pre-existing data entities in the first computing node are replaced with the corresponding one or more data entities of the pre-existing data entities in the first computing node to enable making the second computing node consistent with respect to the first computing node. The transmitting of the one or more data entities occurs for each pair of computing nodes such that one or more data entities are transmitted from the pre-existing data entities in one computing node to the pre-existing data entities in another computing node if the determined mapping factor is less than 100 percent.

It will be appreciated that various steps involved in the process are only illustrative and other alternatives can also be provided where one or more steps are added in the process, one or more steps are removed in the process, or one or more steps are provided in a different sequence in the process without departing from the scope of the claims herein.

In an embodiment, the processor is further configured to determine the mapping factor and transmit one or more data entities based on a mapping factor for each computing node with respect to each of the other computing nodes. Optionally, the process performed by the processor is executed for each computing node and the first computing node. Optionally, the process performed by the processor is executed for each pair of computing nodes present in the distributed communication network. Optionally, the process is performed by the processor is executed for each computing node with respect to each of the other computing nodes.

In an embodiment, the processor is further configured to determine an inconsistency probability factor for each computing node of the plurality of computing nodes which have a mapping factor equal to 100 percent. Throughout the present disclosure, the term "inconsistency probability factor" refers to a probability of a given computing node to have one or more data entities inconsistent with respect to pre-existing data entities in one or more other computing nodes. Specifically, inconsistency probability factor refers to a ratio of number of computing nodes with respect to which a given computing node is inconsistent to the total number of computing nodes, with which the given computing node has established communication. In other words, the inconsistency probability factor refers to a ratio of number of computing nodes with respect to which a given computing node that has a mapping factor equal to 100 percent to the total number of computing nodes with which the given computing node has established communication.

Optionally, a given computing node having a mapping factor equal to 100 percent potentially represents a false positive. Therefore, the mapping factor of the given computing node is determined with respect to each of the other computing nodes in the distributed communication network to determine the probability inconsistency probability factor. Optionally, a given computing node having a mapping factor less than 100 percent is potentially also representative of false positives. Therefore, the mapping factor of the given computing node is determined with respect to each of the other computing nodes to determine the inconsistency probability factor.

In an embodiment, the processor is further configured to transmit one or more data entities to a given computing node, from a computing node having a mapping factor equal to 100 percent after a first iteration of the process, if the inconsistency probability factor of the given computing node is less than a threshold inconsistency probability factor. The term "threshold inconsistency probability factor" refers to a value of the inconsistency probability factor below which the given computing node is determined to be representing a false positive. The term "first iteration" refers to a first step in which the first computing node establishes a communication with each of the other computing nodes and the processor executes the process described above. It will be appreciated that the one or more data entities are transmitted to the given computing node to enable verified recordal, namely consistent recordal, of data entities in the given node. Beneficially, transmitting one or more data entities to the given computing node, from the computing node having the mapping factor equal to 100 percent after the first iteration of the process, if the inconsistency probability factor of the given computing node is less than the threshold inconsistency probability factor may reduce a probability of occurrence of false positive. Moreover, the potential false positives from the first iteration of the process eliminated from the system results in improved reliability and robustness of the system. Optionally, the inconsistency probability factor is determined for each computing node, and the one or more data entities are transmitted if the inconsistency probability factor of the given computing node is less than the threshold inconsistency probability factor. In an example, a threshold inconsistency probability factor is 40 percent. In such an example, if an inconsistency probability factor of a given computing node is equal to 30 percent, for example, then one or more data entities are transmitted to the given computing node. Optionally, the threshold inconsistency probability factor may decrease after every iteration of the process as the probability of the false positives may decrease with every iteration of the process of transmitting one or more data entities to the given computing node, from the computing node having the mapping factor equal to 100 percent. Optionally, the threshold inconsistency probability factor may become zero indicating consistency of recordal of the data entities in the plurality of computing nodes in the distributed communication network.

In an example, there are 4 computing nodes: A, B, C and D such that A has a data entity absent in B, C and D. In such a case, when A computing node sends a Bloom filter to each of B, C and D computing node, in a first iteration, C and D computing node determine that they have a missing data entity whereas B has a false positive and thereby B determines that it contains the missing data entity. However, in the second iteration B is contacted by each of A, C and D computing nodes using bloom filter and thereby B has a false positive for only A. Therefore, an inconsistency probability factor of B decreases in second iteration in comparison to first iteration. Each of the nodes A, B, C and D sends unique bloom filter to each other with a unique mapping. The sending of unique bloom filter would increase the probability of replicating the missing data entity in the computing node. Further, the probability of false positive for a missing data entity would decrease with every iteration of sending bloom filter to the particular computing node from the other computing nodes.

Beneficially, using the unique bloom filter mapping between the computing nodes results in replication of the missing data entity across the plurality of computing nodes in bandwidth efficient manner.

A probability of a given data entity to be transmitted from one computing node to another computing node using the Bloom filter discussed in the present disclosure, is given by a formula:

$$A = [(1-(1-1/m)^{kn})^k]^N$$

wherein,
A is probability of N computing nodes to not distinguish between data entity missing in them;
N is number of computing nodes contacted by a given node;
m is a size of the Bloom filter;
(1−1/m) is probability of a given bit in the Bloom filter to not switch to one upon execution of hashing function;
$(1-1/m)^k$ is probability of a given bit in the Bloom filter to not switch to one upon execution of each of the k hash values generated by hashing function; and
$(1-1/m)^{kn}$ is probability of a given bit in Bloom filter to still be equal to zero upon insertion of n data entities in the Bloom filter.

Optionally, the probability of the given data entity to be transmitted from one computing node to another computing node using the Bloom filter increases with every iteration of the process once the given data entity is present in one subset of computing node.

Beneficially, the present disclosure enables use of a Bloom filter with a smaller size compared to the Bloom filter used conventionally; such a smaller size enables more efficient operation of the system with less data memory utilization being required. Moreover, in the present disclosure, a false positive of a given computing node decreases upon an increase in the number of computing nodes contacted by the given computing node.

In some example embodiments, a first distributed communication network employs a conventional Bloom filter and a second distributed communication network employs the Bloom filter of the present disclosure. Furthermore, both the conventional Bloom filter and the presently disclosed Bloom filter have a false positive rate of up to 50 percent. Moreover, a number of computing nodes in each of the first distributed communication network and the second distributed communication network is, for example, 50, such that each computing node has to converge to a number of entities equal to 1000. Furthermore, the size of the Bloom filters used by each computing node of the first distributed communication network and the second distributed communication network are optionally same after acquiring data entities. In such a case, it will be appreciated that after 4 iterations, all the computing nodes in the second distributed communication network converge to 1000 number of entities, while, the average number of entities that all the computing nodes in the first distributed communication network have would be 793.

In another example embodiment, a first distributed communication network employs a conventional Bloom filter and a second distributed communication network employs the Bloom filter of the present disclosure. Furthermore, both the conventional Bloom filter and the Bloom filter of the present disclosure optionally have a false positive rate of up to 50 percent. Moreover, a number of computing nodes in each of the first distributed communication network and the second distributed communication network is, for example, 50, such that each computing node has to converge to a number of entities equal to 1000. Furthermore, the size of the Bloom filters used by each computing node of the first distributed communication network and the second distributed communication network optionally change after acquiring data entities. In such a case, it will be appreciated that after 5 iterations, all the computing nodes in the second distributed communication network would converge to 1000 number of entities, while, 18 computing nodes in the second distributed communication network would converge to 1000 number of entities. However, in such a case, the first distributed communication network would need to employ more computational power compared to the second distributed communication network. The present invention therefore provides for more efficient and response operation of the system.

Therefore, a number of iterations involved in making verified recordal, namely consistent recordal, of data entities in the plurality of computing nodes by using the Bloom filter of the present disclosure are smaller compared to a number of iterations involved in making verified recordal of data entities in the plurality of computing nodes by using the Bloom filter that is employed conventionally.

In an exemplary implementation, a social networking platform employs the bloom filter as discussed in the present disclosure. The social networking platform provides information to users in a form of posts. The social networking platform using the bloom filter of the present disclosure would be able to provide recommendations to users based on the posts previously viewed by the user. Because of the verified recordal of data entities between the various nodes (servers) of the social networking platform, the platform having access to the posts previously viewed by the user is able to determine a genre of posts that the user prefers to view and thereby can recommend new posts to the user. In another exemplary implementation, a search engine platform employs the Bloom filter as discussed in the present disclosure to identify malicious websites; such identification enhances an operating robustness of the system. The search engine platform using the Bloom filter, has access to one or more websites which are detected as malicious by one or more users and with the verified recordal, namely consistent recordal, of data entities, thereby such websites are not made accessible to users in future. In yet another exemplary implementation, a database management platform employs the Bloom filter as discussed in the present disclosure to reduce a time period associated with searching an item in the database using the Bloom filter; such a reduction in the time period enables to system to be response on account of an access speed to search for data being improved. The database management platform using the Bloom filter has a record of different instructions performed on items and thereby based on the record is operable to search a given item efficiently.

Moreover, the present description also relates to the method as described above. The various embodiments and variants disclosed above apply mutatis mutandis to the method.

Optionally, in the method, the processor is further configured to determine the mapping factor and transmit one or more data entities based on a mapping factor for each computing node with respect to each of the other computing nodes. The mapping factor is a measure of consistency between data sets.

Optionally, in the method, the processor is further configured to determine an inconsistency probability factor for each computing node of the plurality of computing nodes which have a mapping factor equal to 100 percent.

Optionally, in the method, the processor is further configured to transmit one or more data entities to a given computing node, from a computing node having mapping factor equal to 100 percent after a first iteration of the process, if the inconsistency probability factor of the given computing node is less than a threshold inconsistency probability factor.

Optionally, in the method, the processor is further configured to execute a hashing function to generate the hash value of each pre-existing data entity in the plurality of computing nodes Optionally, in the method, the first set of instructions comprises executing an XOR mathematical function and a subsequent hashing function.

Optionally, in the method, the first set of instructions further comprises concatenating a random value before executing the hashing function.

Optionally, in the method, the second set of instructions comprises executing an XOR mathematical function.

Optionally, in the method, the processor is further configured to execute a modulo mathematical operation on the second set of values before generating the data structure.

Optionally, in the method the data structure is a Bloom filter.

DETAILED DESCRIPTION OF THE DRAWINGS

Referring to FIG. 1, there is shown a schematic illustration of a system 100 that, when in operation, provides verified recordal of data entities therein, in accordance with an embodiment of the present disclosure. The system 100 comprises a plurality of computing nodes depicted as computing nodes 102A, 102B, 102C and 102D that are communicably coupled to each other via a distributed communication network. Moreover, each of the plurality of computing nodes 102A, 102B, 102C and 102D comprises a processor 104A, 104B, 104C and 104D respectively.

Figure 2A:
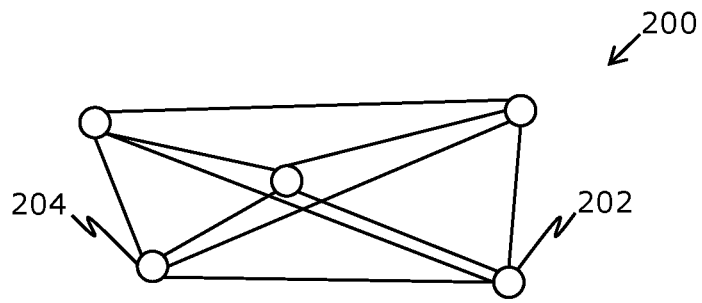
FIGS. 2A-D are exemplary implementations of a distributed communication network employing a Bloom filter, in accordance with an embodiment of the present disclosure.

Referring to FIGS. 2A-2D, there are provided illustrations of exemplary implementations of a distributed communication network 200 employing a Bloom filter (not shown), in accordance with an embodiment of the present disclosure. FIGS. 2A-DD represent different iterations of a process implemented on the distributed communication network 200. Herein, the Bloom filter employed by the distributed communication network 200 has a false positive rate of up to 50 percent. As shown, the distributed communication network 200 comprises a plurality of computing nodes, depicted as computing nodes 202, 204. Although only two computing nodes 202, 204 have been depicted, these two computing nodes 202, 204 represent 'n' number of computing nodes herein. Each of the plurality of computing nodes 202, 204 has to converge to a fixed number of entities. Moreover, a size of the Bloom filters used by each of the plurality of computing nodes 202, 204 is same after acquiring a data entity.

Referring to FIG. 2A, there is shown an illustration of a first iteration of the process implemented on the distributed communication network 200. In the first iteration, no computing node of the plurality of computing nodes 202, 204 would have converged to the fixed number of entities.

Figure 2B:
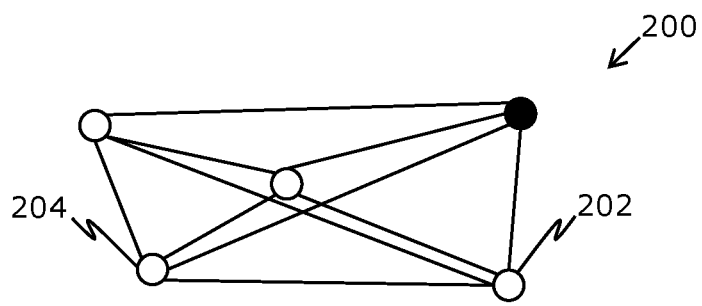

Referring to FIG. 2B, there is shown an illustration of a second iteration of the process implemented on the distributed communication network 200. In the second iteration, one of the computing nodes of the plurality of computing nodes 202, 204 would have converged to the fixed number of entities.

Figure 2C:
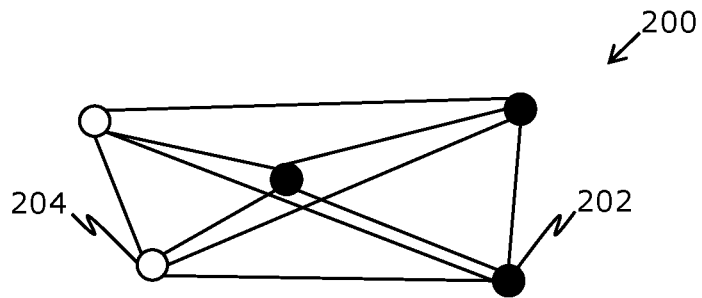

Referring to FIG. 2C, there is shown an illustration of a third iteration of the process implemented on the distributed communication network 200.

In the third iteration, a number of (for example, a plurality of) computing nodes of the plurality of computing nodes 202, 204 would have converged to the fixed number of entities.

Figure 2D:
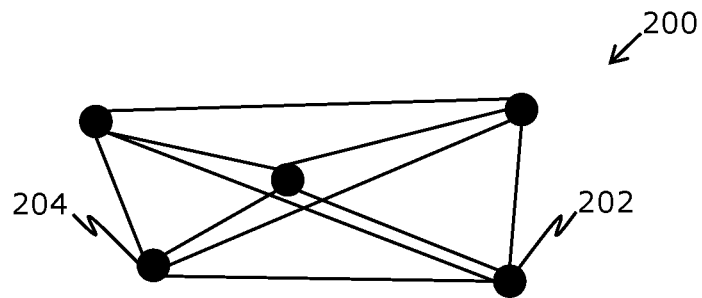

Referring to FIG. 2D, there is shown an illustration of a fourth iteration of the process implemented on the distributed communication network 200. In the fourth iteration, all computing nodes of the plurality of computing nodes 202, 204 would have converged to the fixed number of entities.

Figure 3:
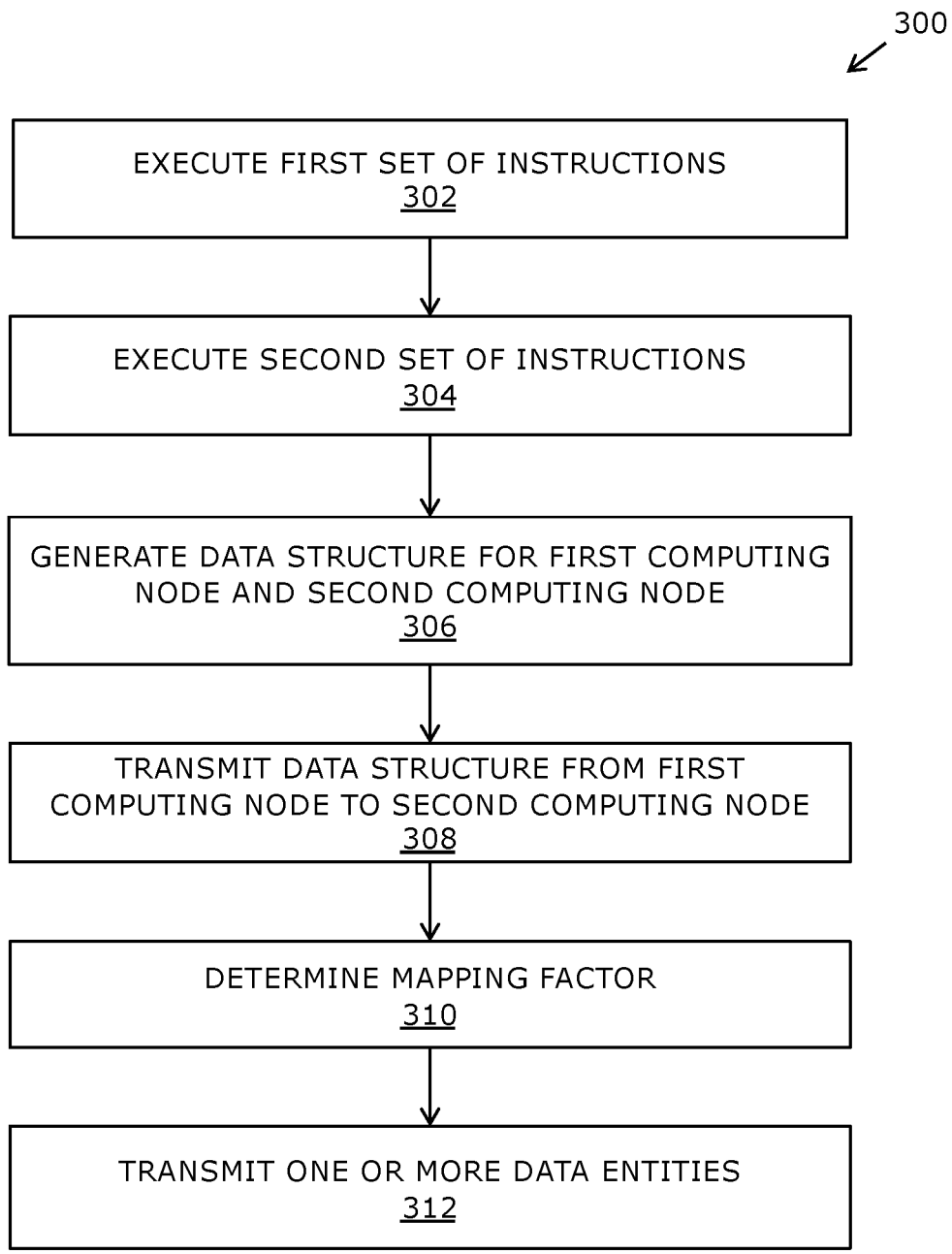
FIG. 3 is an illustration of steps of a method for (namely, a method of) providing mapped recordal of data entities therein, in accordance with an embodiment of the present disclosure.

Referring to FIG. 3, there is shown an illustration of steps involved in a method 300 for providing verified recordal, namely consistent recordal, of data entities with a system, in accordance with an embodiment of the present disclosure; such verification within the system includes trust between computing nodes of the system, thereby making operation of the system more reliable and stable. The method 300 is implemented for operating a system comprising a plurality of computing nodes that are communicably coupled to each other via a distributed communication network, wherein each computing node includes a processor, and wherein each computing node comprises a hash value of each data entity of pre-existing data entities therein. At a step 302, a first set of instructions are executed on a nonce of a first computing node of the plurality of computing nodes and a nonce of a second computing node of the plurality of computing nodes to generate a first set of values. At a step 304, a second set of instructions are executed on the hash value of each pre-existing data entity of the first computing node and the first set of values, to generate a second set of values. At a step 306, a data structure is generated for the first computing node and the second computing node based on the second set of values. At a step 308, the data structure is transmitted from the first computing node to the second computing node. At a step 310, a mapping factor (representative of data consistency) is determined based on the data structure representative of whether or not the pre-existing data entities in the second computing node are consistent with respect to the pre-existing data entities in the first computing node. At a step 312, one or more data entities from the pre-existing data entities in the first computing node is transmitted to the pre-existing data entities in the second computing node if the determined mapping factor is less than 100 percent.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising a plurality of computing nodes that are communicably coupled to each other via a distributed communication network, wherein each computing node includes a processor, wherein each computing node comprises a hash value of each data entity of pre-existing data entities therein, and wherein the system operates to provide verified recordal of data entities therein, to achieve a more stable, efficient and robust operation of the system, wherein the processor is configured to:
- execute a first set of instructions on a nonce of a first computing node of the plurality of computing nodes and a nonce of a second computing node of the plurality of computing nodes to generate a first set of values;
- execute a second set of instructions on the hash value of each pre-existing data entity of the first computing node and the first set of values, to generate a second set of values;
- generate a data structure for the first computing node and the second computing node based on the second set of values;
- transmit the data structure from the first computing node to the second computing node;
- determine a mapping factor based on the data structure representative of whether or not the pre-existing data entities in the second computing node are consistent with respect to the pre-existing data entities in the first computing node; and
- transmit one or more data entities from the pre-existing data entities in the first computing node to the pre-existing data entities in the second computing node if the determined mapping factor is less than 100 percent;

wherein the processor is further configured to:
- determine an inconsistency probability factor for each computing node of the plurality of computing nodes which have a mapping factor equal to 100 percent,
- transmit one or more data entities to a given computing node, from a computing node having mapping factor equal to 100 percent after a first iteration of the process, if the inconsistency probability factor of the given computing node is less than a threshold inconsistency probability factor.

2. A system of claim 1, wherein the processor is further configured to determine the mapping factor and transmit one or more data entities based on a mapping factor for each computing node with respect to each of the other computing nodes.

3. A system of claim 1, wherein the processor is further configured to execute a hashing function to generate the hash value of each pre-existing data entity in the plurality of computing nodes.

4. A system of claim 1, wherein the first set of instructions comprises executing an XOR mathematical function and a subsequent hashing function.

5. A system of claim 4, wherein the first set of instructions further comprises concatenating a random value before executing the hashing function.

6. A system of claim 1, wherein the second set of instructions comprises executing an XOR mathematical function.

7. A system of claim 1, wherein the processor is further configured to execute a modulo mathematical operation on the second set of values before generating the data structure.

8. A system of claim 1, wherein the data structure is a Bloom filter.

9. A method of operating a system comprising a plurality of computing nodes that are communicably coupled to each other via a distributed communication network, wherein each computing node includes a processor, and wherein each computing node comprises a hash value of each data entity of pre-existing data entities therein, and wherein the system operates to provide verified recordal of data entities therein, to achieve a more stable, efficient and robust operation of the system, wherein the method includes configuring the processor to perform a process comprising:
- executing a first set of instructions on a nonce of a first computing node of the plurality of computing nodes and a nonce of a second computing node of the plurality of computing nodes to generate a first set of values;
- executing a second set of instructions on the hash value of each pre-existing data entity of the first computing node and the first set of values, to generate a second set of values;
- generating a data structure for the first computing node and the second computing node based on the second set of values;
- transmitting the data structure from the first computing node to the second computing node;
- determining a mapping factor based on the data structure representative of whether or not the pre-existing data entities in the second computing node are consistent with respect to the pre-existing data entities in the first computing node; and
- transmitting one or more data entities from the pre-existing data entities in the first computing node to the pre-existing data entities in the second computing node if the determined mapping factor is less than 100 percent-;

wherein the method further comprises:
- determining an inconsistency probability factor for each computing node of the plurality of computing nodes which have a mapping factor equal to 100 percent,
- transmitting one or more data entities to a given computing node, from a computing node having mapping factor equal to 100 percent after a first iteration of the process, if the inconsistency probability factor of the given computing node is less than a threshold inconsistency probability factor.

10. A method of claim 9, wherein the data structure is a Bloom filter.

11. A computer program product comprising a non-transitory computer-readable storage medium having computer-readable instructions stored thereon, the computer-readable instructions being executable by a computerized device comprising processing hardware to execute a method of operating a system comprising a plurality of computing nodes that are communicably coupled to each other via a distributed communication network, wherein each computing node includes a processor, and wherein each computing node comprises a hash value of each data entity of pre-existing data entities therein, and wherein the system operates to provide verified recordal of data entities therein, to achieve a more stable, efficient and robust operation of the system, wherein the method includes configuring the processor to perform a process comprising:
- executing a first set of instructions on a nonce of a first computing node of the plurality of computing nodes and a nonce of a second computing node of the plurality of computing nodes to generate a first set of values;
- executing a second set of instructions on the hash value of each pre-existing data entity of the first computing node and the first set of values, to generate a second set of values;
- generating a data structure for the first computing node and the second computing node based on the second set of values;

transmitting the data structure from the first computing node to the second computing node;

determining a mapping factor based on the data structure representative of whether or not the pre-existing data entities in the second computing node are consistent with respect to the pre-existing data entities in the first computing node; and transmitting one or more data entities from the pre-existing data entities in the first computing node to the pre-existing data entities in the second computing node if the determined mapping factor is less than 100 percent;

wherein the method further comprises:

determining an inconsistency probability factor for each computing node of the plurality of computing nodes which have a mapping factor equal to 100 percent, transmitting one or more data entities to a given computing node, from a computing node having mapping factor equal to 100 percent after a first iteration of the process, if the inconsistency probability factor of the given computing node is less than a threshold inconsistency probability factor.

\* \* \* \* \*